US008758118B2

(12) United States Patent
Cowan et al.

(10) Patent No.: US 8,758,118 B2
(45) Date of Patent: Jun. 24, 2014

(54) APPARATUS FOR DETERMINING THE AWARD OF A PLURALITY OF SETS OF PRIZES

(75) Inventors: Stephen Cowan, New South Wales (AU); Dean Wright, New South Wales (AU)

(73) Assignee: Paltronics Australasia Pty Limited, Taren Point, NSW (AU)

(*) Notice: Subject to any disclaimer, the term of this patent is extended or adjusted under 35 U.S.C. 154(b) by 486 days.

(21) Appl. No.: 12/663,658

(22) PCT Filed: Jun. 6, 2008

(86) PCT No.: PCT/AU2008/000823

§ 371 (c)(1), (2), (4) Date: Dec. 8, 2009

(87) PCT Pub. No.: WO2008/148171

PCT Pub. Date: Dec. 11, 2008

(65) Prior Publication Data

US 2010/0184506 A1 Jul. 22, 2010

(30) Foreign Application Priority Data

Jun. 8, 2007 (AU) ................................ 2007903114

(51) Int. Cl.
*G06F 17/00* (2006.01)

(52) U.S. Cl.
USPC .................... 463/25; 463/20; 463/30; 463/40

(58) Field of Classification Search
USPC .......................................... 463/20, 25, 30, 40
See application file for complete search history.

(56) References Cited

U.S. PATENT DOCUMENTS

| | | | | |
|---|---|---|---|---|
| 5,564,700 | A | 10/1996 | Celona | |
| 6,375,567 | B1 | 4/2002 | Acres | |
| 6,416,409 | B1 | 7/2002 | Jordan | |
| 7,780,523 | B2 * | 8/2010 | Baerlocher et al. | 463/26 |
| 7,841,939 | B2 * | 11/2010 | Baerlocher et al. | 463/25 |
| 2003/0199308 | A1 | 10/2003 | Parker | |
| 2005/0037837 | A1 * | 2/2005 | Rowe | 463/25 |
| 2006/0166731 | A1 | 7/2006 | Yoshimi et al. | |
| 2006/0172804 | A1 * | 8/2006 | Acres et al. | 463/42 |
| 2006/0217189 | A1 * | 9/2006 | Walker et al. | 463/25 |
| 2006/0240889 | A1 * | 10/2006 | Walker et al. | 463/20 |
| 2008/0090651 | A1 | 4/2008 | Baerlocher | |

FOREIGN PATENT DOCUMENTS

| | | | |
|---|---|---|---|
| AU | 198653370 | A1 | 8/1986 |
| EP | 1380998 | A2 | 1/2004 |
| WO | 9712315 | A1 | 4/1997 |
| WO | 0017825 | A2 | 3/2000 |
| WO | 2005008514 | A1 | 1/2005 |

* cited by examiner

*Primary Examiner* — Paul A D'Agostino
*Assistant Examiner* — Brandon Gray
(74) *Attorney, Agent, or Firm* — Brooks Kushman P.C.

(57) ABSTRACT

The apparatus includes memory for storing prize values and an input device being responsive to a plurality of gaming terminals for providing an increment signal which adjusts an accumulated value. A comparator determines when the current prize value to be awarded, reaches the accumulated value generates an award signal and removes from the one of the sets the prize awarded. A controller responsive to the award signal determines if the one of the sets includes at least one remaining prize value and, if so, actuating the increment device to define the current prize value as the at least one remaining prize value.

20 Claims, 5 Drawing Sheets

APPARATUS FOR DETERMINING THE AWARD OF A PLURALITY OF SETS OF PRIZES

FIELD OF INVENTION

The present invention relates to an apparatus and method for determining the award of a plurality of sets of prizes where each prize in each set has a respective prize value.

The invention has been developed primarily for use with a plurality of interlinked gaming machines in a gaming establishment and will be described hereinafter with reference to this application. However, the invention is not limited to that particular field of use and is also suitable for use with online gaming, gaming machines that are distributed over a plurality of gaming establishments, lotto, pools, lotteries, art unions, bingo, raffles and other games involving one or more wagers being placed upon an outcome having a finite probability of occurring.

BACKGROUND

It is known to "link" gaming machines to provide a number of additional functionalities. This includes the ability to control the awarding of a prize, as the pool of available funds is greater and the amount of funds available is known rather than having to be estimated. Another functionality of interlinked gaming machines is that secondary gaming is possible. For example, for a given group of interlinked gaming machines, a central display provides the gamers with a visual indication of a presently available jackpot prize that is being incrementally increased as the gamers operate the interlinked gaming machines. It is known by the gamers that the prize will be awarded when it is incremented to a randomly selected value that is less than a predefined value. Typically, the predefined value will also be visually indicated to the gamers by the display.

The use of such functionality is intended to provide additional impetus to the gamers to play the machines and thereby win the jackpot prize in addition to any prize available to be awarded by the respective machine. However, with the increasing sophistication of the gainers and their approach to gaming, the interest in the jackpot prize has diminished.

The discussion of the prior art within this specification is to assist the addressee understand the invention and is not an admission of the extent of the common general knowledge in the field of the invention and is included without prejudice.

SUMMARY OF THE INVENTION

It is an object of the present invention to overcome, or at least substantially ameliorate, one or more of the disadvantages of the prior art or at least to provide a useful alternative.

According to a first aspect of the invention there is provided an apparatus for determining the award of a plurality of sets of prizes where each prize in each set has a respective prize value, the apparatus including:

memory for storing data indicative of the prize values;

an input device being responsive to input signals from a respective plurality of gaming terminals for providing an increment signal;

an increment device for: accessing the data to define a current prize value as one of the prize values from one of the sets; and being responsive to the increment signal for incrementing an accumulated value toward the current prize value;

a comparator being responsive to the current prize value and the accumulated value for determining if the current prize value is to be awarded and, if so, generating an award signal and removing from the one of the sets the prize value corresponding to the current prize value; and a controller that is responsive to the award signal for determining if the one of the sets includes at least one remaining prize value and:

if so, actuating the increment device to define the current prize value as one of the at least one remaining prize value; and if not, actuating the increment device to define the current prize value as one of the prize values from another one of the sets.

In an embodiment, the data is also indicative of the sets.

In an embodiment, the data is indicative of whether the current prize value has been defined by the respective prize values.

In an embodiment, the prize values fall within a range between an upper prize value and a lower prize value and the memory also contains data indicative of the upper prize value and the lower prize value. Preferably, the controller is responsive to the upper prize value and the lower prize value for actuating the increment device to define the current prize value. More preferably, the controller is responsive to the award signal for setting the accumulated value to one or other of the upper prize value or the lower prize value. In some embodiments, the controller is responsive to award signal for alternatively setting the accumulated value to the upper prize value and the lower prize value.

In an embodiment, one or more of the terminals are respective gaming machines.

In an embodiment, one or more of the terminals are computer devices such as stand alone desktop computers.

In an embodiment, one or more of the terminals include gaming machines and computer devices.

In an embodiment, the computer devices are linked to the apparatus via web-enabled or other online interfaces.

In an embodiment, the apparatus includes a payout device that is responsive to the increment signal and the award signal for selecting the terminal to which the prize is awarded. Preferably, each terminal includes a gaming balance and the payout device, upon selecting the terminal, credits the respective gaming balance. More preferably, the payout device credits the gaming balance by the accumulated value.

In an embodiment, the apparatus includes a display driver for providing persons using the terminals with a visual indication of the accumulated value. Preferably, the gaming machines are located in an establishment, and the display driver is a dedicated hardware and software device that drives an LED display that is prominently located within the establishment.

In an embodiment, the display driver is coded into communications protocol between the apparatus and the computer devices. Preferably, the driver also provides persons using the terminals with a visual indication of one or more of:

the upper prize value;

the lower prize value; and whether the accumulated value is incrementing toward the upper or the lower prize value.

In an embodiment, the comparator is part of the controller.

According to a second aspect of the invention there is provided a method for determining the award of a plurality of sets of prizes where each prize in each set has a respective prize value, the method including:

for storing data indicative of the prize values;

being responsive to input signals from a respective plurality of gaming terminals for providing an increment signal;

providing an increment device for: accessing the data to define a current prize value as one of the prize values from one of the sets; and being responsive to the increment signal for incrementing an accumulated value toward the current prize value;

being responsive to the current prize value and the accumulated value for determining if the current prize value is to be awarded and, if so, generating an award signal and removing from the one of the sets the prize value corresponding to the current prize value; and being responsive to the award signal for determining if the one of the sets includes at least one remaining prize value and:

if so, actuating the increment device to define the current prize value as one of the at least one remaining prize value; and if not, actuating the increment device to define the current prize value as one of the prize values from another one of the sets.

According to a third aspect of the invention there is provided an apparatus for determining the award of a plurality of sets of prizes where each prize in each set has a respective prize value, the apparatus including:

memory for storing data indicative of the prize values;

an input device being responsive to input signals from a respective plurality of gaming terminals for providing an increment signal;

an increment device for: accessing the data to define a current prize value as one of the prize values from one of the sets; and being responsive to the increment signal for incrementing an accumulated value toward the current prize value;

a comparator being responsive to the current prize value and the accumulated value for determining if the current prize value is to be awarded and, if so, generating an award signal; and a controller that is responsive to the award signal for determining if the one of the sets includes at least one prize value that has not been defined as the current prize value and:

if so, actuating the increment device to define the current prize value as another of the prize values in the one of the sets; and if not, actuating the increment device to define the current prize value as one of the prize values from another one of the sets.

According to a fourth aspect of the invention there is provided a method for determining the award of a plurality of sets of prizes where each prize in each set has a respective prize value, the method including:

storing data indicative of the prize values;

being responsive to input signals from a respective plurality of gaming terminals for providing an increment signal;

providing an increment device for: accessing the data to define a current prize value as one of the prize values from one of the sets; and being responsive to the increment signal for incrementing an accumulated value toward the current prize value;

being responsive to the current prize value and the accumulated value for determining if the current prize value is to be awarded and, if so, generating an award signal; and being responsive to the award signal for determining if the one of the sets includes at least one prize value that has not been defined as the current prize value and:

if so, actuating the increment device to define the current prize value as another of the prize values in the one of the sets; and if not, actuating the increment device to define the current prize value as one of the prize values from another one of the sets.

According to a fifth aspect of the invention there is provided an apparatus for determining the award of a plurality of sets of prizes where each prize in each set has a respective prize value, the apparatus including:

memory for storing data indicative of the prize values;

an input device being responsive to input signals from a respective plurality of gaming terminals for providing an increment signal;

an increment device for: accessing the data to define a current set as one of the sets and a current prize value as one of the prize values from the current set; and being responsive to the increment signal for incrementing an accumulated value toward the current prize value;

a comparator being responsive to the current prize value and the accumulated value for determining if the current prize value is to be awarded and, if so, generating an award signal; and a controller that is responsive to the award signal for determining if the current set includes at least one prize value that has not been defined as the current prize value and:

if so, actuating the increment device to define the current prize value as another of the prize values in the current set; and if not, actuating the increment device to define the current set as another of the sets and to define the current prize value as one of the prize values from the current set.

According to a sixth aspect of the invention there is provided a method for determining the award of a plurality of sets of prizes where each prize in each set has a respective prize value, the method including:

storing data indicative of the prize values;

being responsive to input signals from a respective plurality of gaming terminals for providing an increment signal;

providing an increment device for: accessing the data to define a current set as one of the sets and a current prize value as one of the prize values from the current set; and being responsive to the increment signal for incrementing an accumulated value toward the current prize value;

being responsive to the current prize value and the accumulated value for determining if the current prize value is to be awarded and, if so, generating an award signal; and being responsive to the award signal for determining if the current set includes at least one prize value that has not been defined as the current prize value and:

if so, actuating the increment device to define the current prize value as another of the prize values in the current set; and if not, actuating the increment device to define the current set as another of the sets and to define the current prize value as one of the prize values from the current set.

According to a seventh aspect of the invention there is provided an apparatus for determining the award of a plurality of prizes having respective prize values that define a set of prize values, where the prize values in the set are greater than or equal to a lower prize value and less than or equal to an upper prize value, the apparatus including:

memory for storing data indicative of the prize values;

an input device being responsive to input signals from a respective plurality of gaming terminals for providing an increment signal;

an increment device for accessing the memory to define a current prize value as one of the prize values in the set and being responsive to the increment signal for incrementing an accumulated value toward one of the upper prize value and the lower prize value;

a comparator being responsive to the current prize value and the accumulated value for determining if the current prize value is to be awarded and, if so, generating an award signal; and a controller that is responsive to the award signal for selectively actuating the increment device to define the current prize value as another one of the prize values in the set.

In an embodiment, the controller is responsive to the award signal for determining if there is at least one prize value in the set yet to be awarded and:

if there is, selectively actuating the increment device to define the current prize value as another one of the prize values in the set; and if there is not, selectively actuating the increment device to define the current prize value as a prize value from another set of prize values.

In an embodiment, the increment device selects the another one of the prize values to define the current prize value randomly from the set, excluding the one of the prize values.

In an embodiment, the increment device selects the another one of the prize values to define the current prize value as that prize value, other than the one of the prize values, which is closest to the accumulated value.

In an embodiment, the increment device increments the accumulated value toward the upper prize value and selects the another one of the prize values to define the current prize value as that prize value, other than the one of the prize values, which is next greater than the accumulated value.

In an embodiment, the increment device increments the accumulated value toward the lower prize value and selects the another one of the prize values to define the current prize value as that prize value, other than the one of the prize values, which is next less than the accumulated value.

According to an eighth aspect of the invention there is provided a method for determining the award of a plurality of prizes having respective prize values that define a set of prize values, where the prize values in the set are greater than or equal to a lower prize value and less than or equal to an upper prize value, the method including the steps of:

storing data indicative of the prize values;

being responsive to input signals from a respective plurality of gaming terminals for providing an increment signal;

accessing the data with an increment device to define a current prize value as one of the prize values in the set;

being responsive to the increment signal for incrementing an accumulated value toward one of the upper prize value and the lower prize value;

being responsive to the current prize value and the accumulated value for determining if the current prize value is to be awarded and, if so, generating an award signal; and being responsive to the award signal for selectively actuating the increment device to define the current prize value as another one of the prize values in the set.

BRIEF DESCRIPTION OF THE DRAWINGS

Preferred embodiments of the invention will now be described, by way of example only, with reference to the accompanying drawings, in which.

DETAILED DESCRIPTION OF THE PREFERRED EMBODIMENTS

At least some of the embodiments of the invention make use of certain elements of hardware and software similar to that disclosed in PCT application PCT/AU2004/000964 the disclosure of which is incorporated herein by way of cross-reference.

Figure 1:
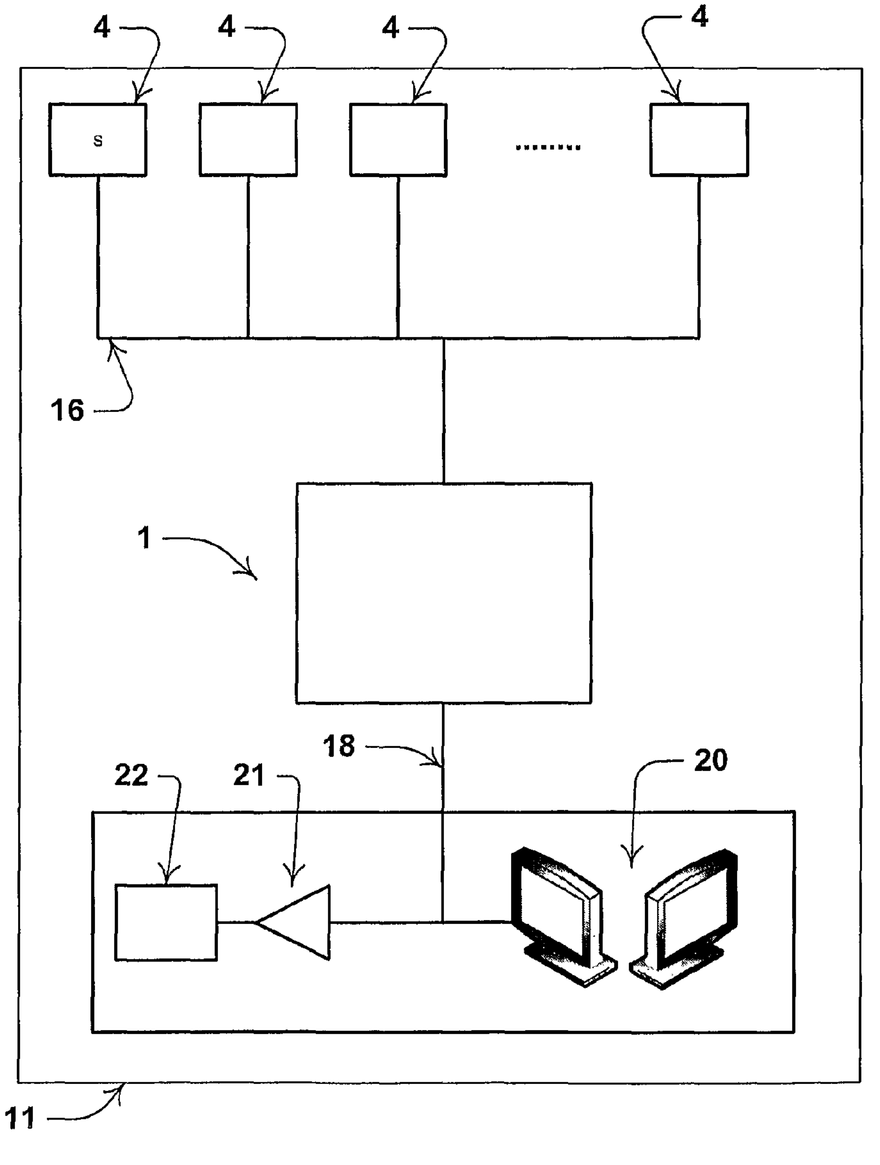
FIG. 1 is a schematic view of a gaming network including an apparatus according to the invention.
Figure 2:
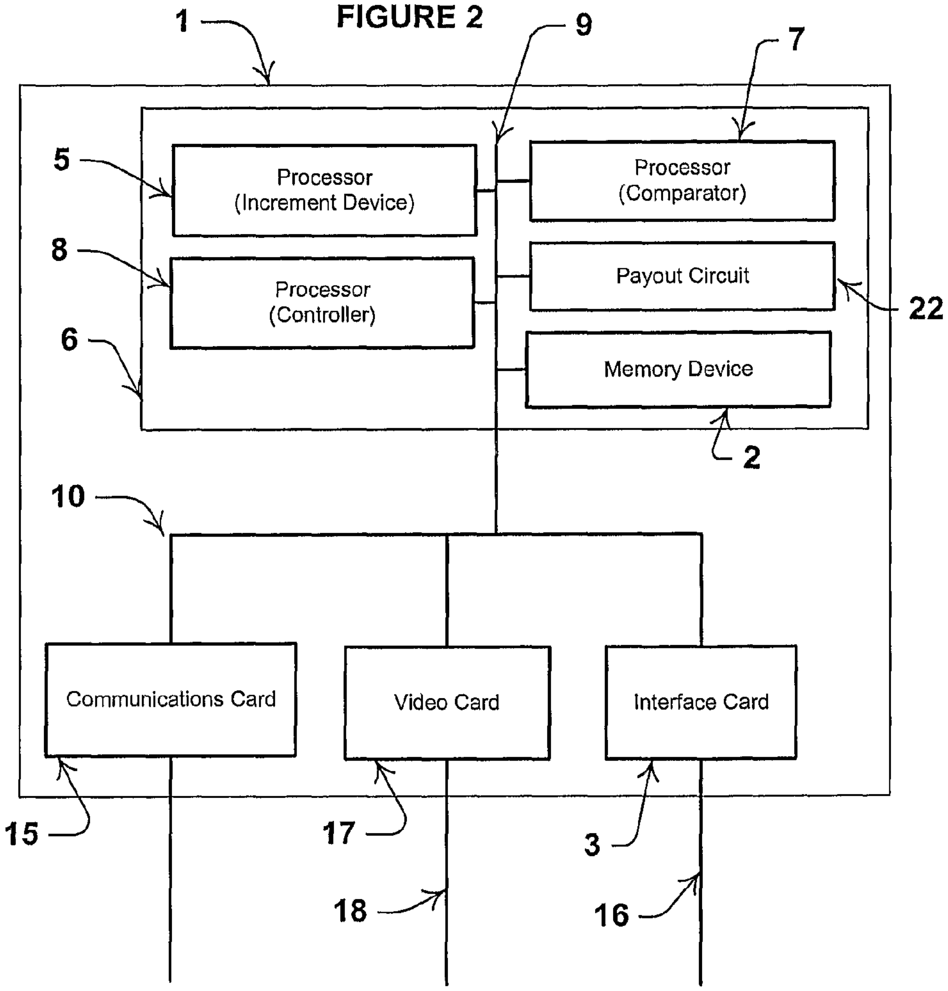
FIG. 2 is a schematic view in more detail of the apparatus shown in FIG. 1.

Referring to FIG. 2 there is provided an apparatus 1 for determining the award of a plurality of sets of prizes where each prize in each set has a respective unique prize value. Apparatus 1 includes memory in the form of a memory device 2 for storing data indicative of, amongst other things, the prize values. An input device, in the form of a serial electronic interface (SEI) card 3, is responsive to input signals from a respective plurality of gaming terminals 4—where the terminals 4 are shown in FIG. 1—for providing an increment signal. An increment device, in the form of a local processor 5, is mounted to a motherboard 6 and accesses the data from device 2 to define a current prize value as one of the prize values from one of the sets. Processor 5 is also responsive to the increment signal for incrementing an accumulated value toward the current prize value. A comparator, in the form of a further local processor 7, is responsive to the current prize value and the accumulated value for determining if the current prize value is to be awarded and, if so, generating an award signal and removing from the one of the sets the prize value corresponding to the current prize value. A controller, in the form of a central processor 8, is responsive to the award signal for determining if the one of the sets includes at least one remaining prize value and:

if so, actuating processor 5 to define the current prize value as one of the at least one remaining prize value; and if not, actuating processor 5 to define the current prize value as one of the prize values from another one of the sets.

In other embodiments, card 3 is a network card designed to retrieve the appropriate information from a plurality of gaming devices, whether those devices be stand alone gaming machines, personal computers running gaming software, lottery terminals, or the like.

In this specification use is made of the term Electronic Gaming Machine (EGM) to refer to a gaming machine, where these types of machines are also known as poker machines or slot machines. The FIG. 2 embodiment is specifically developed for use with a plurality of EGMs that are linked by a computer network having a communication protocol to allow the participation of the gamers of the EGMs in a linked jackpot or common game. This common game is provided by an operator of apparatus 1 in addition to the primary game that the gamers are playing on respective EGMs. Each terminal includes a further SEI card (not shown) for linking the terminal to the network and for allowing communication between the terminals and apparatus 1 via card 3.

In the FIG. 1 embodiment the EGMs are co-located within a common room or gaming establishment and are linked by a LAN maintained by an operator of the establishment. While in this specific embodiment the operator of the establishment is different to the operator of apparatus 1, in other embodiments there is a common operator. Moreover, in other embodiments, the EGMs are more geographically dispersed, and are linked by a WAN or other network that is maintained or owned by more than one operator and/or other parties.

It will also be appreciated that the network communications between nodes within any network—that is, any nodes within the WAN, LAN or other network—is preferably achieved primarily with physical cabling. In other embodiments, however, use is made of wireless communication paths either in combination with or as an alternative to the cabling.

Memory device 2 includes one or more of the following elements:

A hard disk drive.

RAM.

ROM.

A CD/DVD drive for selectively containing a CD/DVD.

The data is selectively stored in one or more of the above elements. In addition, it will be appreciated that all of processors 5, 7 and 8 will include some onboard cache that is also able, if and when required, to contain some or all of the data.

The data is held in the one or more elements as a data table having the following columns:

| Column Header | General Description |
|---|---|
| Prize Number | A unique integer or string for each prize in the table. Preferably the integer or string is unique for all prizes to be awarded by the embodiment. |
| Set Number | A unique integer or string to identify the set that each prize value has been assigned. Preferably the integer or string is unique for all prizes to be awarded by the embodiment. |
| Prize Value | A value for each prize, typically a financial value expressed in a currency used in the jurisdiction. In other embodiments, however, the value is expressed in non-financial units or symbols. A sub-set of these other embodiments later converts the units or symbols to a currency. |
| Write Time | The time the prize was written to the table. Expressed as accurately as allowed by the timing software used. |
| Set Award Flag | Each set of prize values includes a flag that, when set, indicates all the prizes in the respective set have been awarded. That is, when the flag is not set it indicates the respective set has within it at least one prize value that has not been used to define the current prize value. |
| Prize Award Flag | This flag applies to each prize, and is set to indicate that the respective prize has been awarded. That is, this field in this column of the data table is indicative of whether the current prize value has been defined by the respective prize values and awarded. |
| Award Time | The time the prize was awarded. Expressed as accurately as allowed by the timing software used. Prior to a prize being awarded, this field in the table - for that specific prize - has a null value. |
| Award EGM | Indicative of the EGM that provided the input signal immediately preceding the generation of the award signal. |
| Upper Prize Value | Indicative of the maximum value of prize able to be awarded by the embodiment. This is typically set by the operator of the gaming venue or venues in which the EGMs are disposed and is usually displayed or otherwise made known to the gamers. |
| Lower Prize Value | Indicative of the minimum value of prize able to be awarded by the embodiment. This is typically set by the operator of the gaming venue or venues in which the EGMs are disposed and is usually displayed or otherwise made known to the gamers. |

In other embodiments alternative or additional columns are included in the table.

Processor 8 operates to ensure that once processor 5 has defined the current prize value by a prize value in one of the sets, that the current prize value will be subsequently defined consecutively by the other prize values selected from the same set prior to a prize value being selected from another of the sets of prize values. Moreover, processor 8 operates such that all the prize values from the one of the sets are all selected, but only once, before the current prize value is defined by a prize value that is selected from another of the sets.

In other embodiments the prize values need not be unique. Preferably, however, the prize values in each set are unique.

In further embodiments once all the prize values from one set have been awarded, processor 8 controls processor 5 to select a prize value from another of the sets that satisfies one or more predetermined conditions. Once the selection of the prize value occurs, the set from which that selection was made becomes the current set. For example, in a specific embodiment one of the predetermined conditions is that the prize value from the another of the sets is higher than the accumulated value. Another example of one of the predetermined conditions is that the prize value from the another of the sets is less than the accumulated value. A further example of one of the predetermined conditions is that the prize value from the another of the sets is closest to the accumulated value in the direction of the increment. That is, if the accumulation is incrementing toward the upper value it will be able to continue incrementing and relatively quickly progress to the award of the next jackpot. This sequence is intended to minimise the risk of gamers being aware of a change between sets.

It will be appreciated that the selection of prize values as suggested above will have implications for the resetting of the accumulation value between sets.

In this embodiment, the upper and lower prize values include default values which are respectively higher and lower than each of the prize values included in the sets. The prize values are derived to provide a distribution between the upper and lower prize values to satisfy one or more of:

A desired distribution—random or otherwise—across the range defined by the upper and lower prize values.

A desired average prize value.

A desired number of prize values.

The distribution, relative size and other characteristics of these values are often set by an operator of apparatus 1. This operator in this embodiment is different to the operator of the gaming venue and the EGMs. However, in other embodiments, both operators are the same party.

It will also be appreciated that in this embodiment all the prize values for the prizes in all the sets are pre-determined prior to any prize having been awarded. In other embodiments, however, the quantum of each prize value is not determined until that prize value is selected to define the current prize value. That is, in some embodiments the prize values are not determined until the prize has been selected from the set to be the next awarded prize. In further embodiments at least one of the prize values is predetermined, and the remainder are determined only when selected to define the current prize value.

The operator of the gaming establishment (also known as a gaming venue) is able to set the upper and lower values in accordance with the desired size of maximum and minimum prize values to be awarded to gamers of EGMs provided in the establishment. This in turn is based upon a number of factors such as the average value of the wagers regularly made at the venue, the turnover at the venue, the time of day, the percentage of the wager made at the EGMs that is indicated by the input signal as being contributed to the accumulated value, and others.

In response to any change by the venue operator of the upper and lower values from the default values there is a scaling of all the prize values to substantively retain the desired distribution of prize values between the upper and lower values. It will be appreciated that some rounding of prize values does occur during this operation to account for the number of decimal places being used determining the awarded prize amount.

In other embodiments the prize values are all predetermined and any adjustment by the venue operator of the upper and lower values has no effect on the prize values.

Processor 8, in determining which prize value is to next define the current prize value, selects another prize value from the same set—that is, the current set—where that prize value has not previously been selected to define the current value. In this embodiment, the selection is random based upon the remaining prize values in the current set, and the accumulated value then increments toward the newly defined current prize value. In other embodiments, however, the prize value to next define the current value is alternatively selected to be greater and less than the current prize value immediately prior to the selected. Other embodiments, however, have the accumulated value originally defined as one of the upper prize value or lower prize value, and the increments of the accumulated value are always toward the other of those values. Accordingly, in those embodiments where the accumulated value is originally defined as the lower prize value, the current prize value is always selected as being the lowest remaining prize value. In this instance, the prizes are awarded sequentially in ascending order. In those embodiments where the accumulated value is originally defined as the upper prize value, the current prize value is always selected as being the highest remaining prize value. In this instance, the prizes are awarded sequentially in descending order.

In still further embodiments, the accumulated value is set to one of the upper and lower values and allowed thereafter to increment to the newly defined current prize value. In alternative embodiments, the accumulated value is alternatively set to the upper value and the lower value and allowed thereafter to increment to the newly defined current prize value.

If processor 8 determines there are no available prize values to select from the current set, then another set is selected to define the current set, and a prize value selected from this next set is used to define the current prize value.

The selection of the prize value from the current set is, in some embodiments, also based upon one or more of:

A random selection of the available prize values.

The current prize value immediately preceding the selection.

Motherboard 6 includes a communications bus 9 for accommodating the communication between the various computing components shown.

It will be appreciated that FIG. 2 is highly schematic and is intended to provide the skilled addressee with an understanding of the functionality provided by apparatus 1 and the interaction between the components illustrated. It would be understood from the teaching herein that those functionalities and interactions are able to be implemented in other ways. For example, for the purposes of clarity, the functionality of processor 7 is, in this embodiment, is separated from that of processor 5. However, in practice, the functions of one or more of processors 5, 7 and 8 are able to be performed by a single processor.

Card 3 is a dedicated hardware device that is linked to bus 9 by an external communications bus 10. Both these buses are schematic representations of a plurality of digital lines. In some embodiments, bus 10 includes one or more analogue lines—for video and audio—in addition to the digital lines.

As shown in FIG. 1, terminals 4 are respective gaming machines that are co-located in a single gaming establishment 11. While only four terminals are shown, it is usual to have many more than this—from ten to many hundreds—linked by apparatus 1. Where it is desired to link greater numbers of terminals use is made of a structured network of apparatus 1. To this end, apparatus 1 includes a network card or communications card 15, as shown in FIG. 2. In some embodiments, card 15 is configured for wireless communication.

Terminals 4 are typically physically arranged in groups or lines and are presented to make them easily accessible for gamers and to contribute to the social event engaged in by the gamers. Each terminal includes a dedicated interface card (not shown) to provide and receive predetermined communications signals to a 10 Mbits/s Cat 5 communications bus 16. In other embodiments use is made of an existing network, such as CMS, to affect the required communications.

Bus 16 is also linked to card 3 for allowing apparatus 1 to communicate with terminals 4. It will be appreciated that terminals 4 in this embodiment do not communicate with each other, but only with apparatus 1. However, the communication between each terminal and apparatus 1 is two-way.

In practice, apparatus 1 is located away from terminals 4 and in a location that is easily accessible by technical staff of the establishment. For example, in some embodiments, apparatus 1 takes the form of a networked server and is located together with other servers and computer equipment in a dedicated room within the establishment.

As best shown in FIG. 2, apparatus 1 includes a display driver in the form of a video card 17 for providing a video output signal that contains information indicative of the accumulated value. In some embodiments, the video output signal includes data indicative of one or more of the upper prize value and the lower prize value. For example, in instances where the accumulated value is being incremented by processor 5 toward the upper prize value, the video signal includes data indicative of the upper prize value such that the gamers using terminals 4 will have that information displayed to them. However, in other embodiments information indicative of the both the upper and lower prize values is included in the video signal and other cues are used to provide the gamer with an indication of which of those values is of greater relevance at any given time.

Card 17 is provided command and data signals by processor 5 via bus 9 and 10. These signals are processed by the circuitry and software available on the card to provide the output signal that is, in this embodiment, propagated via a video and audio cable 18.

Cable 18 provides a video feed for a dual screen video display 20, and audio reproduction devices in the form of amplifier 21 and a plurality of spaced apart speakers 22. In this embodiment, display 20 includes two large LED displays that are prominently located within establishment 11 near terminals 4. For larger establishments with a greater number of terminals, or where the terminals are for other reasons spatially dispersed, display 20 includes a plurality of spaced apart LED or other displays for best providing all the gamers of terminals 4 with the desired information about the progress of the central jackpot game in which they are participating. Particularly, the location of the LED displays allows the gamers utilising terminals 4 to easily determine the quantum of the accumulated value. In this embodiment, display 20 also provides the gamers with a visual indication of one of the upper prize value and the lower prize value and whether the accumulated value is incrementing upwardly or downwardly. This will be described in more detail below with reference to FIG. 3.

In other embodiments, the LED display is substituted with one or more spaced apart plasma screens, video projectors, television monitors, CRT projectors or other display devices. The use of spaced apart display devices is particularly advantageous where there are many terminals 4 within the establishment, or where those terminals 4 are distributed widely within the establishment. For those embodiments where terminals 4 are not all in the same establishment, then provision is made for separate displays in the separate establishments.

The use of display 20 is advantageous as it provides information to the gamers and allows them to derive more entertainment and enjoyment for a given wager. It is also advantageous to have display 20 as a separate component that is prominently located, as that provides open information to potential gamers as to extra benefits of terminals 4 over prior art terminals.

In other embodiments, a separate display 20 is not used. That is, the visual indication is provided as a digital signal via bus 16 directly to terminals 4. In turn, this signal is received by the respective interface cards in the terminals and displayed on the screens of the terminals. In further embodiments use is made of both a separate display 20 and a display on each of the individual terminals.

There are also embodiments where not all terminals 4 are located at within the same establishment. That is, terminals 4 are located across at least two different establishments.

Apparatus 1 includes a payout device in the form of a payout circuit 22 on board 6, which is responsive to the increment signal and the award signal for selecting the terminal to which the prize is awarded. It will be appreciated that each terminal 4 includes data indicative of a gaming balance that is available to the gamer using that terminal. Circuit 22, upon selecting the terminal, credits the respective gaming balance. In this embodiment circuit 22 credits the gaming balance by the accumulated value. In other embodiments the gaming balance is credited by a different amount. In any event, once the gamer has decided to cease the gaming session, the credit balance is redeemed in the usual manner. This includes, by way of example, a cash payout from the terminal, a ticket printed by the terminal, the update of the gamer's smartcard by the terminal, or the gamer seeking the payment from a cashier or other centralised payment point. If the accumulated amount is large, the most practical ways of affecting a redemption requested by the gamer is to:

Affect a manual payment.

Transfer the value to the player's terminal.

If available, print a ticket using a ticket printing device located at the terminal.

Credit the player's credit card or online wallet.

Transfer the money to a mobile device with technology for allowing such a transfer—such as, but not limited to, a cellular telephone, a PDA, or a mobile computer—for redemption at a later time.

Figure 4:
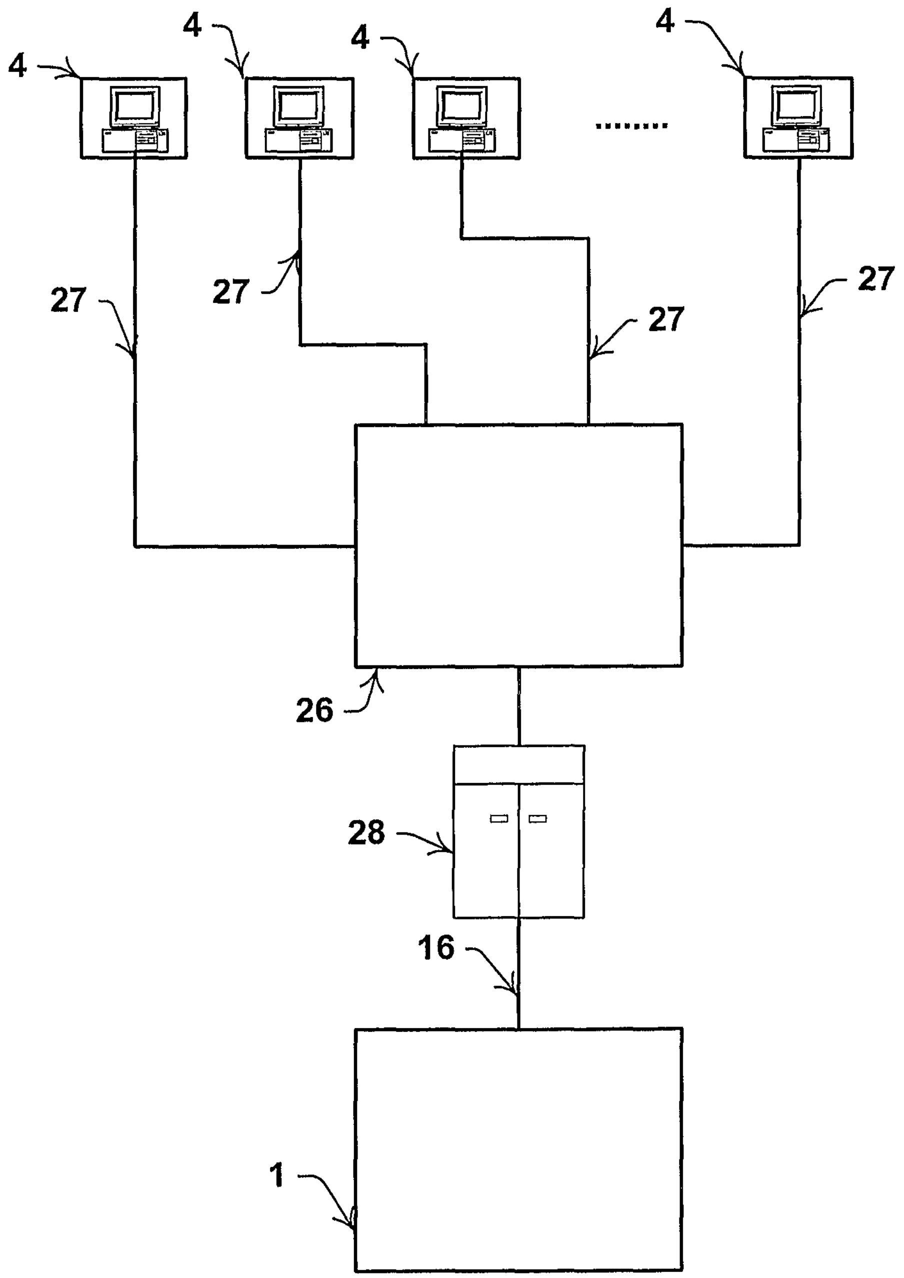
FIG. 4 is a schematic view of an online gaming network including an apparatus according to the invention.

In other embodiments, such as that shown in FIG. 4, terminals 4 are computer devices such as stand alone desktop computers that are remotely located. In this embodiment, each computer is at the residence of the respective gamers. The computers are each linked to the internet 26 via telephone lines 27. Apparatus 1, on the other hand, is linked to an internet server 28 via bus 16.

Server 28 allows communication between terminals 4 and apparatus 1 to provide the same functionality as that achieved by the FIG. 1 embodiment. However, in this case, the delivery of the information is browser based.

In some embodiments, apparatus 1 communicates both with terminals that are gaming machines and terminals that are remotely located desktop computers.

It will be appreciated by those skilled in the art, from the teaching herein, that server 28 will also allow the invention to be performed with terminals that are laptop computers, minicomputers, PDA's and other computing devices with internet, 3G or WAP capability. Moreover, in some embodiments, server 28 is able to interact with gamers by way of the cellular telephone network.

Reference is again made to FIG. 1 and FIG. 2. In use, the gamers operating terminals 4 are participating in a game of chance that is contingent upon the predetermined virtual spacing on a screen of the respective gaming terminals of a number of icons. Once the gamer establishes a credit balance with the terminal, by one of various means, it is possible for the gamer to initiate a gaming sequence. After the sequence has played out, and the result displayed on the screen of the terminal, the terminal then provides the input signal on bus 16 via a further SEI card (not shown). This input signal includes a multi-bit string of information, including a unique identifier for the terminal, the quantum of the wager placed upon the gaming sequence that was completed, and the percentage or part of that wager that is to be used by apparatus 1. When respective gamers are simultaneously playing the terminals, a stream of input signals are provided by the respective SEI cards and received by card 3.

In addition to the individual games of chance, the gamers are also participating in an additional group game of chance, in that they are eligible to win a "jackpot" amount. The two games are independently operated in that the probability of a gamer winning one of the games does not affect their probability of winning the other except insofar as the amount contributed to winning the jackpot amount is contingent upon the quantum of the wager for the individual game of chance being played on the respective gaming terminals.

As mentioned above, memory device 2 includes data indicative of the current prize value, as well as the upper prize value and the lower prize value. The current prize value is the value of the jackpot to be next awarded. The upper prize value is the maximum possible value of the prize to be awarded, while the minimum prize value is the minimum possible value of the prize to be awarded. Device 2 holds the data indicative of the prize values in a data structure such as a data table which includes a plurality of tables having column headers mentioned above. In other embodiments additional, substituted or alternative column headers are used.

Figure 5:
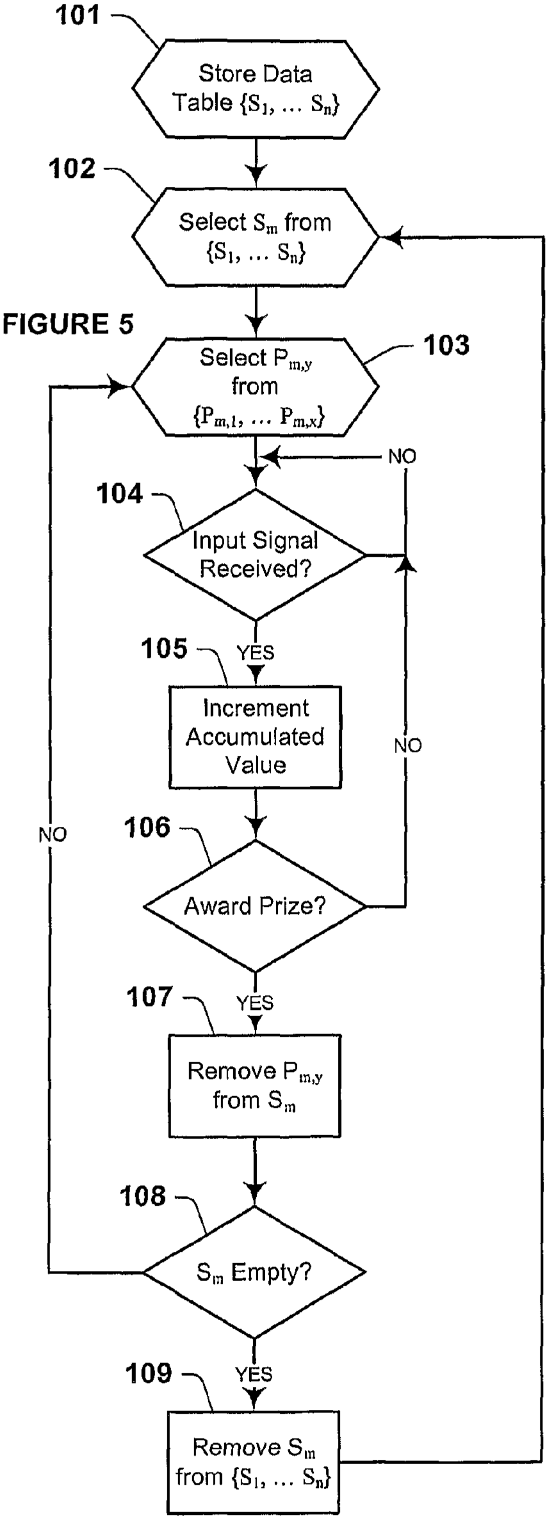
FIG. 5 is a flow chart schematically illustrating the operation of the apparatus of FIG. 2.

At start up, and as schematically illustrated in FIG. 5 at step 101, processor 5 is programmed by code held in memory device 2, on board cache, or other memory, to load the data table into memory device 2. Processor 5 sets, as a default, the accumulated value to one of the upper prize value or the lower prize value, and controls card 17 to ensure that this default accumulated value is visually displayed upon display 20. This amount is displayed as being the value of the jackpot that is presently available to be awarded to a gamer. For this embodiment the default is the lower prize value. For this specific example the accumulated value—that is, the value displayed in area 31 of FIG. 3—is initially $10,000 and ramps upwardly toward the upper prize value. More particularly, the accumulated value ramps upwardly toward the current prize value—once it is set—as the gamers operate terminals 4.

In other embodiments the default accumulated value is randomly selected to lie between the upper and lower value. In further embodiments the default accumulated value is predetermined. In additional embodiments the basis of the selection of the default value changes between successive selections of the default value.

The FIG. 5 flow chart also indicates that processor 5, by undertaking the sequential steps 102 and 103, initially determines the current prize value by:

Randomly or pseudo randomly selecting one of the sets Sm from S1, . . . Sn, where 1≤m≤n (that is, step 102).

From that selected set subsequently selecting one of the prize values Pm,y from {Pm,1, Pm,x} where x≥2 (that is, step 103).

In this specific example, the upper prize value and the lower prize value are $20,000 and $10,000 respectively, and all the prize values in sets S1, . . . Sn lie within the range defined by these upper and lower values. Particularly, in this example, n=3 and x=2 and the prize values in the sets are:

| Set Number (m) | Prize Number (y) | Prize Value |
|---|---|---|
| 1 | 1 | $13,398.39 |
| | 2 | $15.529.28 |
| 2 | 1 | $11,050.30 |
| | 2 | $18,339.00 |
| 3 | 1 | $15,392.76 |
| | 2 | $19,477.08 |

Initially, the value of m is selected to be 1 and the value of y is selected to be 1, and the prize value Pm,y selected from set Sm is indicative of a financial amount of $13,398.39. This prize value is used by processor 5 to define the current prize value.

In other embodiments alternative number of sets are used with alternative numbers of prize values. Moreover, other embodiments include a different value for x for at least two of the sets. That is, in some embodiments the sets need not include the same number of prize values.

Both m and y are selected in this embodiment such that the sets are selected in a predetermined order—that is, the order of their numbering—and the lowest prize value in the current set is selected first to define the current prize value. In other embodiments, both m and y are randomly or pseudo randomly selected, or selected in a different sequence, whether that sequence be predetermined or include a random element.

It will be appreciated that while one or both of the upper and lower prize values are in some embodiments displayed—typically via display 20—or otherwise communicated to the gamers, the current prize value is not revealed to ensure the gamers are provided with an additional entertainment and game of chance.

As the gamers operate the terminals and the respective input signals are provided to card 3. This is schematically illustrated in FIG. 5 at step 104. In some embodiments the increment is a fixed amount per wager. However, more usually, the increment is in proportion to the wager to allow the gamer wagering larger amounts to have a greater chance of being awarded the current prize. The proportion of the wager is usually agreed upon between the operator of apparatus 1 and the operator of the gaming establishment. In some embodiments the proportion is also determined, at least in part, by the respective gamers.

Processor 5 is responsive to the increment signal to increment the accumulated value by the weighting in a direction toward the upper prize value and, hence, toward the current prize value. This is illustrated in FIG. 5 as step 105. In this example the default accumulated value was the lower prize value—$10,000, as described above—and as such the increment of the accumulated value will be upwardly toward both the upper prize value of $20,000 and the current prize value of $13,398.39.

Figure 3:
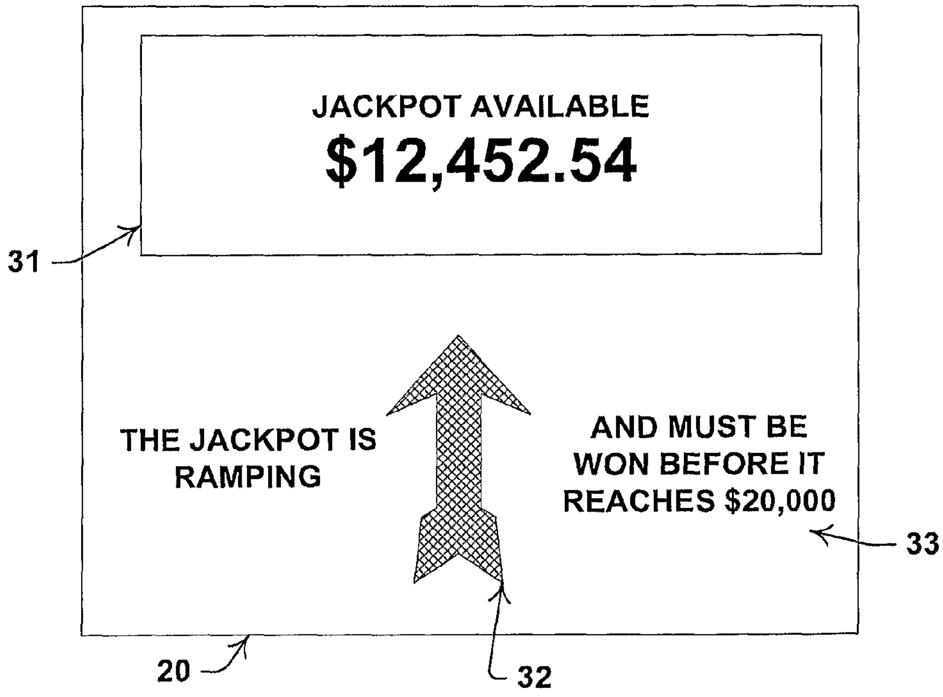
FIG. 3 is a schematic view of a display that is driven by the apparatus of FIG. 2.

The updated accumulated value is displayed on display 20 to ensure that the gamers have access to the revised information. The more the gamers play, and the more they wager, the faster that the accumulated value will increment. An example of display 20 at this stage of a cycle is illustrated in FIG. 3. More particularly, and by way of example only, the accumulated value is illustrated in area 31 as $12,452.54, while the upward increment of the accumulated value is indicated by the upward orientation of arrow 32. The upper prize value is shown in area 33 of display 20, as best shown in FIG. 3.

Arrow 32 is provided on display 20 in this embodiment to indicate to the gamers if the accumulated value is being incremented upwardly or downwardly. As shown in FIG. 3, arrow 32 is pointed upwardly to correspond with the present upward increments that are successively being applied to the accumulated value. For other prize values (or sets of prize values) the accumulated value is incremented downwardly. When that occurs arrow 32 is downwardly directed.

Processor 7 is responsive to the current prize value—which, as mentioned above is presently defined as $13,398.39—and the accumulated value for determining at step 106 when the current prize value is to be awarded. In this embodiment, processor 7 generates the award signal when the difference between the accumulated value and the current value changes sign. That is, processor 7, after each change to the accumulated value, determines the difference between the two values. At the point where the one that was initially larger—in this case the current prize value—is now the smaller is when the award signal is generated.

The award signal is used by processor 8 as an initiator for a number of actions. The first action is to determine which of the terminals was the site of the wager that results in the award signal being generated. This determination is made by reference to the increment signal, which in turn includes data that was extracted from the corresponding input signal. With this done, processor 8 communicates with the terminal, via card 3, to credit the balance by the current prize value. In other embodiments the balance is credited by an amount other than the current prize value. In further embodiments, the current prize value is held on card 3 and is available for payment to the gamer of the relevant gaming terminal.

The next action is to reset the current prize value. Processor 8 drives processor 5 to undertake the required action. Particularly, processor 5 initially removes prize value Pm,y from set Sm at step 107 in FIG. 5. That is, the prize value that has been awarded—that is, for the specific instance of m=y=1—is removed from the current set S1. Accordingly, set S1 now includes only a single prize value P1,2. The other sets remain unchanged. While prize value P1,1 has been removed from the current set S1 that prize value remains in memory. In other embodiments when a prize value is removed from a set it is deleted or otherwise removed from the memory. In still further embodiments, an awarded prize value remains within the current set, but is no longer available for selection to define the current prize value.

Returning to the present embodiment, processor 5 determines at step 108 whether set Sm—in this case set S1—contains any remaining prize values. If so, one of those remaining prize values is randomly, pseudo randomly, sequentially or otherwise selected—for example, in a predetermined order—to redefine the current prize value. In this specific example, processor 5 determines at step 108 that S1 is not empty and progresses to step 103 to select a further prize value from the set. As there is only one remaining prize value (P1,2) in set S1, that prize value will be selected to next define the current prize value as $15.529.28.

In this embodiment, the prize values in each set are selected sequentially in order of size, so that the first prize to be awarded from the set is the lowest prize value and then in ascending order, through to the highest prize value. In turn, this allows the accumulated value to continue progressing toward the upper prize value until all the prizes in the set are awarded. In other embodiments, the upper prize value is the default for the accumulated value, which accumulates downwardly toward the lower prize value. However, in this instance, the selection of the prize values in each set is, while still sequential, in descending order such that the accumulated value increments downwardly toward the lower prize value to successively award the prize values in descending order. Once all the prize values in a set have been used to define the current prize value and have been awarded there is a need to select a new set. At that time it is usual to reset the accumulated value. In some embodiments the accumulated value will be reset to the same of the upper of lower value, in other embodiments the accumulated value for alternative sets is reset to the upper and lower values, while in further embodiments the determination of which of the upper and lower values is selected includes a random element. In still further embodiments the accumulated value is not reset to one of the upper or lower values due to the selection of a further set. For example, in some embodiments the accumulated value simply increments from its present value to the newly defined current prize value. In other embodiments, the accumulated value is reset to an intermediate value between the upper and lower prize values. For example, the intermediate value is in some embodiments is determined with a random element, while in others it is predetermined in fact, or by a mathematical algorithm.

With the current prize value defined as $15,529.28, processor 5 is then responsive to subsequent increment signals to continue to progress the accumulated value toward the upper prize value at step 105 until such time as processor 7 determines at step 106 that the current prize value is to be awarded. Once that occurs, and prize P1,2 is removed from set S1 at step 107, and at step 108 processor 5 determines that set S1 is empty and, at step 109, it removes set S1 from the sets available for selection. That is, the set award flag for S1 is now set, which in effect eliminates set S1 from any subsequent selection of a set. While set S1 is no longer available for selection as the current set, the set, together with the prize values and other data comprising the set, remains held within memory. In other embodiments when a set is no longer available for selection to define the current set, it is deleted or otherwise removed from the memory.

Processor 5 then reverts to step 102 and selects one of S2 and S3 and, in accordance with the methodology described in FIG. 5 and above, progressively defines the current value by all of the available prize values until such time as all the prize values have been successively awarded.

In the embodiment described above, the order of the selection of the sets is solely numerical—as in the selection is based upon m=1, then m=2, then m=3. In other embodiments, however, the selection of the sets include a random component, or is achieved in a predetermined way based upon an algorithm or rule.

In the embodiment described above, the order of the selection of prize values within the current set is on the basis of ascending or descending prize value such that the accumulated value is allowed to progressed toward a single one of the upper or lower values until such time as all the prize values in the set have been awarded. In other embodiments alternative methods are used.

In the FIG. 5 embodiment n=3 and x=2. However, in other embodiments alternative values of n and x are used. For larger gaming establishments with a large number of EGMs and a large turnover it is usual for n and x to be relatively large. For example, in some embodiments n=30 and x=5. For smaller establishments n is typically smaller, but x remains relatively large.

In this embodiment x is the same for all sets S1, Sn, although each prize value is unique. It will also be appreciated that the prize values are randomly determined. In other embodiments the prize values are otherwise determined, but usually always with a random element. For example, in some embodiments for some gaming establishments there is a greater need for certainty of the overall cost of prize values and regard is had to a desired average prize value when determining the prize values. This includes, in some instances, selecting a first prize value randomly within the range defined by the upper and lower prize values. Then the next prize value is selected for the set based upon a more limited range within the upper and lower prize values to ensure the average of the selected prize values approximates to the desired average.

The weighting of the increment to the accumulated value is, in this embodiment, also dependent upon the difference between the successive accumulation values. That is, the operator of apparatus 1 must ensure that the return percentage to the gamers is maintained within the relevant regulated limits. Accordingly, if the difference is large, then the weighting is greater so that each increment is larger than would be the case if the difference were small. It also ensures that the operator is able to gain up-to-date information about the profit margins provided by apparatus 1, be they positive or negative. For example, the operator may be prepared to offer the embodiment as a loss leader, on the basis that those losses are contained to a predetermined percentage. In that case, the return percentage provided by the primary games played on terminals 4 may be lower to ensure that the overall return is within the required parameters.

It will be appreciated that in other embodiments the increment to the accumulated value is wholly in accordance with the contribution by the relevant gaming terminals, and no other weighting is applied.

In other embodiments the rules followed by processor 5 when determining a prize value is different than that suggested above. For example, in one specific embodiment a prize value is determined randomly or pseudo randomly to fall between the lower and the upper prize value rather than being preset. However, the accumulated value is reset alternatively to the upper prize value and the lower prize value. That is, following the issue of an award signal, the incrementing of the accumulation value toggles between a positive increment and a negative increment.

In some venues a plurality of jackpot or secondary games are played in parallel, where the different jackpot games are referred to as different "levels" of jackpot. This terminology arises from the often large differences between the prize values awarded in the different games. It would not be unusual for the differences between prize values awarded in adjacent levels to be an order of magnitude. That is, for each level the ranges defined by the respective pairs of lower prize value and the upper prize value are very different, and usually these ranges do not overlap.

It will be appreciated that some embodiments of the invention are applicable to use with the plurality of secondary games being played in parallel. In particular, each level will include at least two sets of prize values that are awarded as described above with reference to any one of the earlier described embodiments. Accordingly, for a four level secondary game there will be at least eight sets of prize values, and the data table will include a further header row to indicate the level to which the set applies. The sets related to each level will only be awarded in accordance with the progress of the award of prizes at that level, which occurs independently of the award of prizes at the other levels.

It is usual for each level to include a large number of sets—in some embodiments in excess of twenty sets—each of which include about five prize values. For most venues this allows apparatus 1 to operate for a considerable period while:

Providing gamers with variety, in that there are many prize values likely to be awarded at any given time.

Providing operators with some certainty about the quantum of the prize values to be awarded to better allow control of player return rates and costs.

For example, in a four level secondary game, where each level includes twenty sets of five prize values, there are in total four hundred prizes to be awarded.

With prior art system—where typically the accumulated value is always reset to the lower limit—the gamer is more likely to lose interest until such time as the accumulated value rises considerably, assuming that it will do so prior to the current prize value be reached. What has been found is that gamers usually do not take an active interest until the accumulated value is greater than about the half way point between the possible minimum and maximum values.

The preferred embodiments of the invention allow these disadvantages to be overcome by offering more than one jackpot between the upper and lower values. Such jackpots provide the gamers with the ability to wager on the award of a jackpot notwithstanding that another of the jackpots may have been only awarded a short time previously. Additionally, even where use is made of a progressive jackpot, this is in the alternative with the regressive jackpot, so the gamers are able to influence the return to the regressive jackpot through their gaming actions, while still gaining the opportunity to win the progressive jackpot currently being offered.

A significant advantage of the preferred embodiments is that the interest of the gamer is maintained due not only to the multitude of jackpot values, but also due to the variation in the increment or decrement of the accumulation value that is displayed.

Moreover, in some embodiments of the invention there are achieved advantages to the operator of the apparatus and the operator of the gaming venue. Particularly, as the prizes are grouped in sets it is possible, where required, to keep an average prize value across a set to provide the operators with greater certainty of costs of the prize values to be awarded. That is not to say that there will not be some random factor in the determination of those prizes, simply that by having regard to the lower prize value, the upper prize value, and a preferred average prize value that falls between the lower and upper prize value the operators are able to gain better control of the prize values, and better control costs and better ensure that the apparatus of the embodiments remains within any stipulated player payout ratios during the period taken to award the prizes in a set.

It will be appreciated that the term "current prize value" is a variable held in memory device 2 that is set to successively different values depending upon the relevant prize value that is next to be awarded. Once a given prize has been awarded, the current prize value is reset, in that processor 5 is responsive to the prize value of the next selected prize to define a new value for the current prize value.

In some embodiments the apparatus is configured to simultaneously realise the above advantages to the gamers and the operators.

Unless specifically stated otherwise, as apparent from the following discussions, it is appreciated that throughout the specification discussions utilizing terms such as "processing", "processing system", "computing", "calculating", "determining", "analysing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, for example, from registers and/or memory to transform that electronic data into other electronic data that, for example, may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, for example, a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term "memory unit" or "memory" as used herein, if clear from the context and unless explicitly stated otherwise, also encompasses a storage system such as a disk drive unit. The processing system in some configurations may include a sound output device, and a network interface device, for example. The memory subsystem thus includes a computer-readable carrier medium that carries computer-readable code (for example, software) including a set of instructions to cause performing, when executed by one or more processors, one of more of the methods described herein. Note that when the method includes several elements, for example, several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be includes in a computer program product.

In alternative embodiments, the one or more processors operate as a standalone device or may be connected, for example, by being networked to another processor or other processors. In such a networked deployment, the one or more processors may operate in the capacity of a server or a user machine in a server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Where a figure only illustrates a single processor and/or a single memory that carries the computer-readable code, those in the art will understand that many of the components described above are included, but not explicitly shown or described to reduce the risk of obscuring the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions—for example, a computer program—that are for execution on one or more processors. For example, the one or more processors that are part of an apparatus for determining the award of a set of prizes. Thus, as will be appreciated by those skilled in the art, embodiments of the present invention may be embodied as a method, an apparatus such as a special purpose apparatus, an apparatus such as a data processing system, or a computer-readable carrier medium, for example, a computer program product. The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (for example, a computer program product on a computer-readable storage medium) carrying computer-readable program code embodied in the medium.

The software may further be transmitted or received over a network via a network interface device (exemplified by interface card 3 and communications card 15). While the carrier medium is shown in an exemplary embodiment to be a single medium, the term "carrier medium" should be taken to include a single medium or multiple media (for example, a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fibre optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing—that is, a computer—system executing instructions—that is, computer-readable code—stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination as would be understood by a skilled addressee given the benefit of the teaching herein.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus or system embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives “first”, “second”, “third”, etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to a specific examples it will be appreciated that by those skilled in the art that it may be embodied in many other forms.

The invention claimed is:

1. Apparatus for determining the award of a plurality of sets of prizes where each prize in each set has a respective prize value, the apparatus including:

memory configured to store data indicative of a plurality of prize values, wherein each prize value is associated with one of a plurality of sets;

an input device being responsive to input signals from a respective plurality of gaming terminals for providing an increment signal;

an increment device configured to access the memory to define a current prize value as a selected one of the prize values from a selected one of the sets; and increment, upwardly or downwardly, an accumulated value from a start value toward the current prize value in response to the increment signal;

a comparator configured to periodically compare the accumulated value with the current prize value, and, for each such comparison, in the case that the accumulated value has incremented, upwardly or downwardly, to or beyond the prize value:

generating an award signal thereby to award a prize having the current prize value; and removing the selected prize value from the selected one of the plurality of sets; and a controller that is responsive to the award signal for determining if the selected one of the plurality of sets includes at least one remaining prize value and:

if so, actuating the increment device to define a new current prize value corresponding to a remaining prize value in the selected one of the sets and increment, upwardly or downwardly, the accumulated value from the old current prize value toward the new current prize value in response to the increment signal; and if not, actuating the increment device to define a new current prize value corresponding to one of the prize values from another one of the sets, and resetting the accumulated value to a new start value.

2. Apparatus according to claim 1 wherein the data is also indicative of the sets.

3. Apparatus according to claim 2 wherein the data is indicative of whether the current prize value has been defined by the respective prize values.

4. Apparatus according to claim 1 wherein the prize values fall within a range between an upper prize value and a lower prize value and the memory also contains data indicative of the upper prize value and the lower prize value.

5. Apparatus according to claim 4, wherein the controller is responsive to the upper prize value and the lower prize value for actuating the increment device to define the current prize value.

6. Apparatus according to claim 5 wherein, in the case that the selected one of the plurality of sets does not include at least one remaining prize value, the controller is responsive to the award signal for setting the accumulated value to one or other of the upper prize value or the lower prize value.

7. Apparatus according to claim 6 wherein the controller is responsive to award signal for alternatively setting the accumulated value to the upper prize value and the lower prize value.

8. Apparatus according to claim 1 wherein one or more of the terminals are respective gaming machines.

9. Apparatus according to claim 1 wherein one or more of the terminals are computer devices such as stand alone desktop computers.

10. Apparatus according to claim 1 wherein one or more of the terminals include gaming machines and computer devices.

11. Apparatus according to claim 10 wherein the computer devices are linked to the apparatus via web-enabled or other online interfaces.

12. Apparatus according to claim 1 including a payout device that is responsive to the increment signal and the award signal for selecting the terminal to which the prize is awarded.

13. Apparatus according to claim 12, wherein each terminal includes a gaming balance and the payout device, upon selecting the terminal, credits the respective gaming balance.

14. Apparatus according to claim 13 wherein the payout device credits the gaming balance by the accumulated value.

15. Apparatus according to claim 9 including a display driver for providing persons using the terminals with a visual indication of the accumulated value.

16. Apparatus according to claim 15 wherein one or more of the terminals are computer devices such as stand alone desktop computers, and wherein the gaming machines are located in an establishment, and the display driver is a dedicated hardware and software device that drives an LED display that is prominently located within the establishment.

17. Apparatus according to claim 15 wherein one or more of the terminals are computer devices such as stand alone desktop computers, and wherein the display driver is coded into communications protocol between the apparatus and the computer devices.

18. Apparatus according to claim 14 wherein the driver also provides persons using the terminals with a visual indication of one or more of:

the upper prize value;

the lower prize value; and whether the accumulated value is incrementing toward the upper or the lower prize value.

19. Apparatus according to claim 1 wherein the comparator is part of the controller.

20. A computer-implemented method for determining the award of a plurality of sets of prizes where each prize in each set has a respective prize value, the method including:

operating a memory device to store data indicative of a plurality of prize values, wherein each prize value is associated with one of a plurality of sets;

operating an input device to receive to input signals from a respective plurality of gaming terminals for providing an increment signal;

operating an increment device to: access the memory to define a current prize value as a selected one of the prize values from a selected one of the sets; and increment, upwardly or downwardly, an accumulated value from a start value toward the current prize value in response to the increment signal;

operating a comparator to periodically compare the accumulated value with the current prize value, and, for each such comparison, in the case that the accumulated value has incremented, upwardly or downwardly, to or beyond the prize value:

generate an award signal thereby to award a prize having the current prize value; and remove the selected prize value from the selected one of the plurality of sets; and operating a controller to determine, in response to the award signal, whether the selected one of the plurality of sets includes at least one remaining prize value and:

if so, actuating the increment device to define a new current prize value corresponding to a remaining prize value in the selected one of the sets and increment, upwardly or downwardly, the accumulated value from the old current prize value toward the new current prize value in response to the increment signal; and if not, actuating the increment device to define a new current prize value corresponding to one of the prize values from another one of the sets, and resetting the accumulated value to a new start value.

* * * * *

UNITED STATES PATENT AND TRADEMARK OFFICE

CERTIFICATE OF CORRECTION

PATENT NO. : 8,758,118 B2
APPLICATION NO. : 12/663658
DATED : June 24, 2014
INVENTOR(S) : Stephen Cowan et al.

It is certified that error appears in the above-identified patent and that said Letters Patent is hereby corrected as shown below:

In the Claims:

Column 24, Line 1, Claim 20:

After "operating an input device to receive"
Delete "to".

Signed and Sealed this
Sixteenth Day of September, 2014

Michelle K. Lee

Michelle K. Lee
*Deputy Director of the United States Patent and Trademark Office*